(12) United States Patent
Tanaka et al.

(10) Patent No.: US 7,628,329 B2
(45) Date of Patent: Dec. 8, 2009

(54) IMAGE PROCESSING DEVICE, IMAGE PROCESSING METHOD AND STORAGE MEDIUM STORING IMAGE PROCESSING PROGRAM

(75) Inventors: Hironori Tanaka, Kanagawa (JP); Takahiro Saito, Kanagawa (JP); Yukio Iijima, Kanagawa (JP); Hideo Fujii, Kanagawa (JP); Hajime Ichida, Kanagawa (JP); Yuka Aoki, Kanagawa (JP); Junichi Matsunoshita, Kanagawa (JP); Takeshi Onishi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 610 days.

(21) Appl. No.: 11/448,058

(22) Filed: Jun. 7, 2006

(65) Prior Publication Data
US 2007/0109585 A1 May 17, 2007

(30) Foreign Application Priority Data
Nov. 17, 2005 (JP) .............................. 2005-332716

(51) Int. Cl.
*G06K 7/10* (2006.01)
(52) U.S. Cl. ........................ 235/460; 235/375; 235/454

(58) Field of Classification Search ................. 235/460, 235/375, 487, 454; 705/67, 57
See application file for complete search history.

(56) References Cited

U.S. PATENT DOCUMENTS

| 5,008,700 | A * | 4/1991 | Okamoto ..................... 355/401 |
| 7,162,035 | B1 * | 1/2007 | Durst et al. ................... 380/54 |
| 2005/0038756 | A1 * | 2/2005 | Nagel ........................... 705/76 |
| 2006/0124723 | A1 * | 6/2006 | Satake et al. ................. 235/375 |

FOREIGN PATENT DOCUMENTS

| JP | A 2001-346032 | 12/2001 |
| JP | A 2004-112607 | 4/2004 |
| KR | 20-1990-0015071 A | 8/1990 |
| KR | 10-1995-0022812 A | 7/1995 |

* cited by examiner

*Primary Examiner*—Edwyn Labaze
(74) *Attorney, Agent, or Firm*—Oliff & Berridge, PLC

(57) ABSTRACT

An image processing device includes a judgement section and a generation section. A latent image, which would be retained or eliminated by photocopying, is to be superposed with machine-readable code images, which are encoded supplementary information, to generate a superposed image. The judgement section judges overlapping of the latent image with the machine-readable code images. The generation section, on the basis of judgement results from the judgement section, determines an arrangement of the machine-readable code images and generates the superposed image.

19 Claims, 7 Drawing Sheets

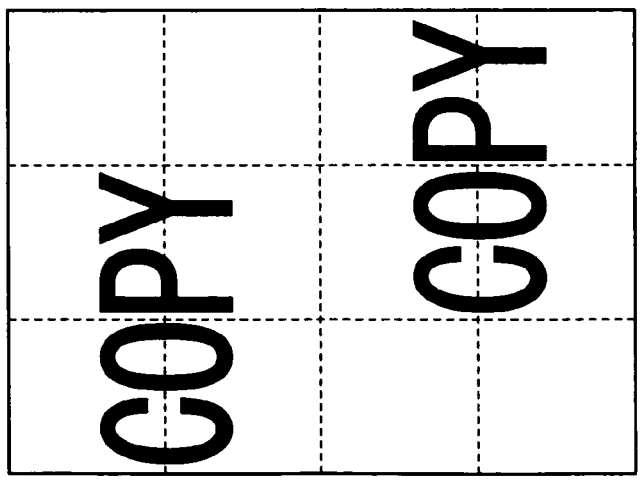

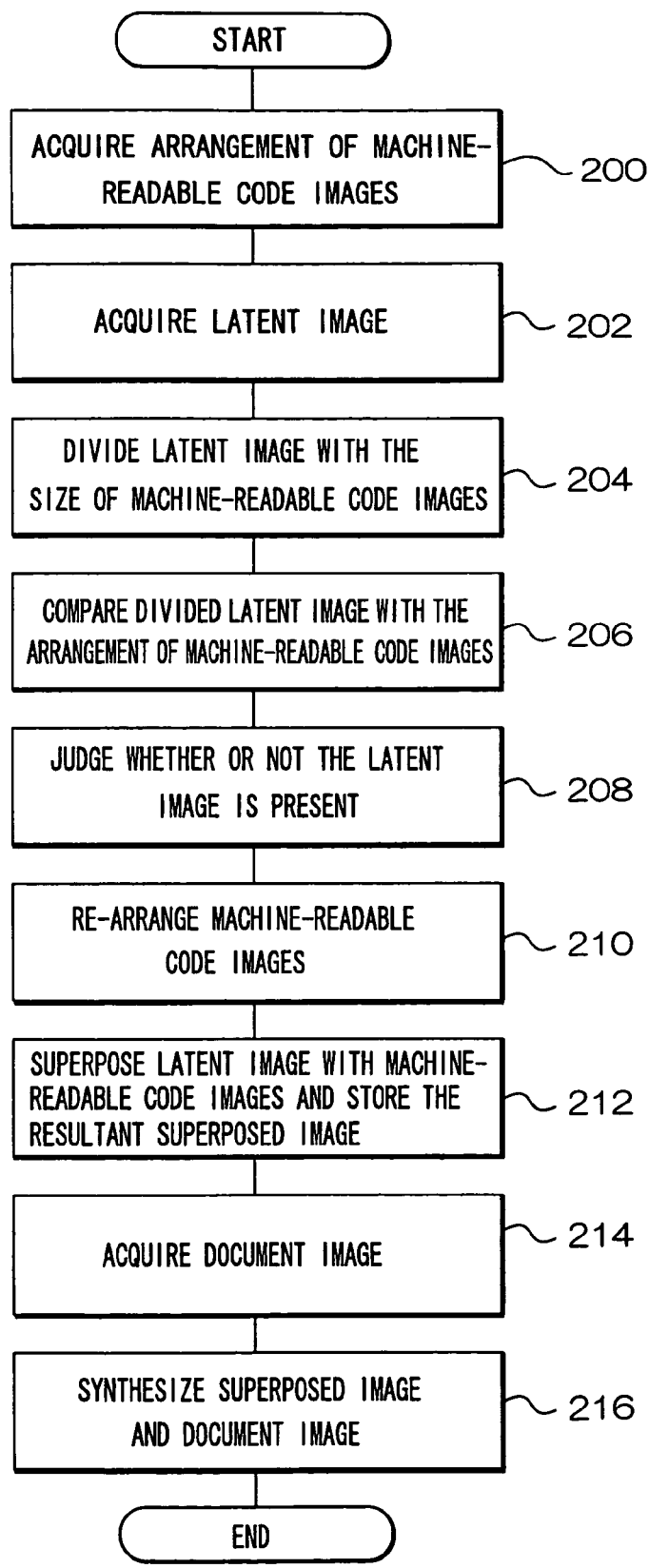

IMAGE PROCESSING DEVICE, IMAGE PROCESSING METHOD AND STORAGE MEDIUM STORING IMAGE PROCESSING PROGRAM

CROSS-REFERENCE TO RELATED APPLICATION

This application claims priority under 35 USC 119 from Japanese Patent Application No. 2005-332716, the disclosure of which is incorporated by reference herein.

BACKGROUND

1. Technical Field

The present invention relates to an image processing device, an image processing method and a storage medium which stores an image processing program, and more particularly relates to an image processing device, image processing method and storage medium storing an image processing program that process images based on document data of which fabrication by photocopying is prohibited.

2. Related Art

With the spread of personal computers in recent years and rising capabilities of printers and photocopiers, a problem has arisen with illegitimate copying and illegitimate usage of confidential documents which are printed out, such as civil registry documents, contracts and the like.

Further, a technology has been proposed which, in order to synthesize larger amounts of additional information, splits the additional information into units of a certain length, generates a plurality of machine-readable code images, and synthesizes these into the background of the document.

Now, when the additional information is to be reconstructed from the machine-readable code images described above, it is desirable that the machine-readable codes appear on the paper in as complete a state as possible. Furthermore, because it is not possible to render both a latent image and a machine-readable code image in the same region, it is required that regions of machine-readable code images do not overlap with regions of a latent image.

However, the conventional technology gives no particular consideration to overlapping of the machine-readable code images with the latent image. Consequently, as shown in FIGS. 7A and 7B, when machine-readable code images are superposed with a latent image, there is a problem in that, of these machine-readable code images, only Codes 2 and 3 can be decoded, while the machine-readable code images of Codes 1 and 4 cannot be decoded.

Consequently, there is a possibility in that there may be machine-readable code images which cannot be decoded.

SUMMARY

An aspect of the present invention provides an image processing device including: a judgement section which, when a latent image is to be superposed with machine-readable code images for generating a superposed image, the latent image is retained or eliminated by photocopying and the machine-readable code images are encoded additional information, judges overlapping of the latent image with the machine-readable code images; and a generation section which, on the basis of judgement results of the judgement section, determines an arrangement of the machine-readable code images and generates the superposed image.

BRIEF DESCRIPTION OF THE DRAWINGS

An embodiment of the present invention will be described in detail based on the following figures, wherein:

FIG. 4A is a view showing an example in which a latent image is divided into a plurality of regions according to the size of machine-readable code images;

FIG. 4B is a view showing results of judgement of whether or not the latent image is present at each of the divided regions;

FIG. 4C is a view showing an example of an arrangement such that all of machine-readable code images are arranged to divided regions at which the latent image is not present;

FIG. 6 is a flowchart showing an example of a flow of superposition processing which is performed by the image synthesis processing system of the image processing device relating to the embodiment of the present invention.

DETAILED DESCRIPTION

Figure 1:
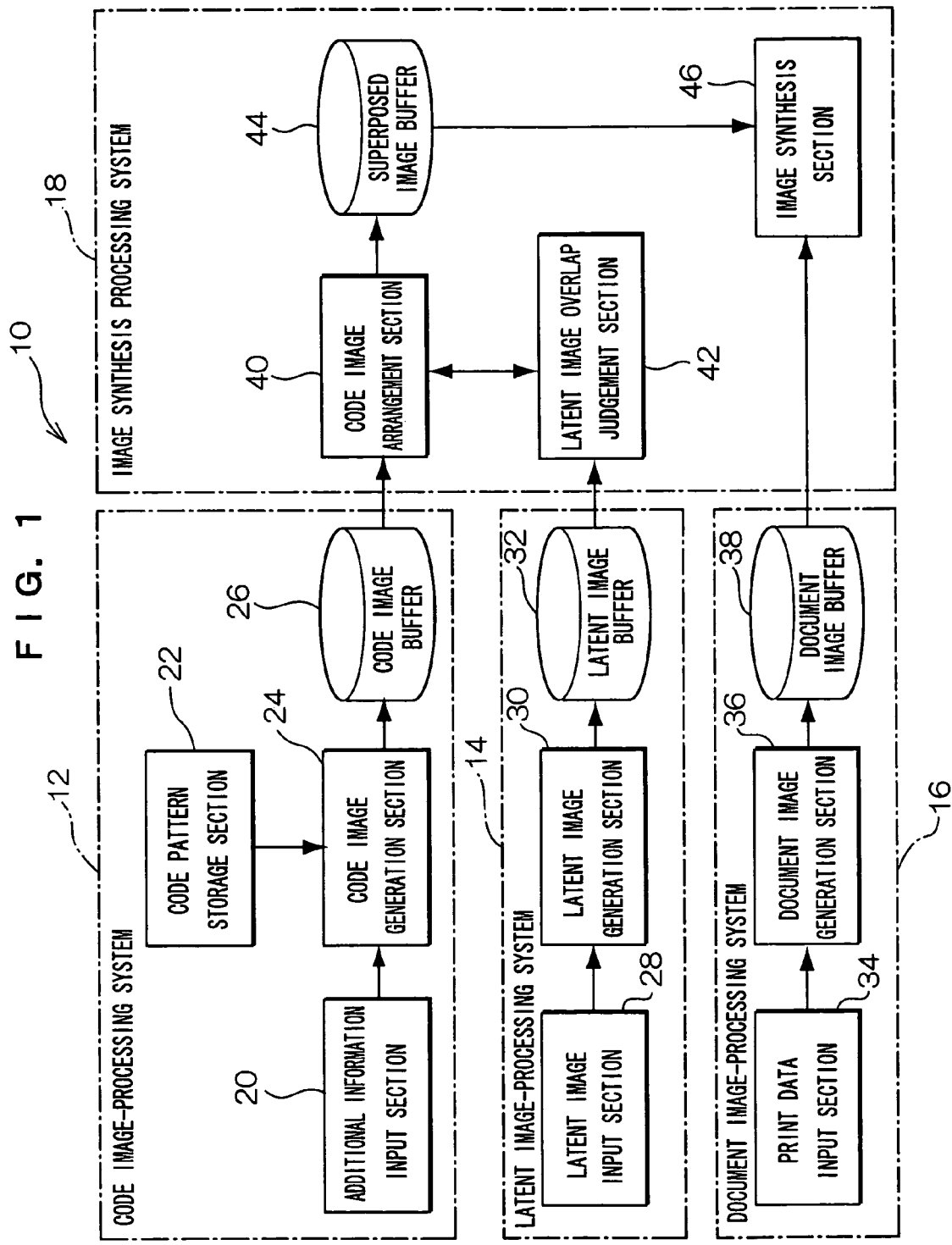
FIG. 1 is a block diagram showing structure of an image processing device relating to an embodiment of the present invention.

Herebelow, an example of an embodiment of the present invention will be described in detail with reference to the drawings. FIG. 1 is a block diagram showing structure of an image processing device relating to the present embodiment of the invention.

As shown in FIG. 1, an image processing device 10 relating to this embodiment is structured with a code image-processing system 12, a latent image-processing system 14, a document image-processing system 16 and an image synthesis processing system 18. Images which have been processed by the respective processing systems of the code image-processing system 12, the latent image-processing system 14 and the document image-processing system 16 are synthesized by the image synthesis-processing system 18. Note that each processing system may be a hardware structure, may be a software structure, and may be a structure combining both hardware and software.

The code image-processing system 12 is structured with an additional information input section 20, a code pattern storage section 22, a code image generation section 24 and a code image buffer 26.

At the code image-processing system 12, additional information to be superposed with the document image is inputted by the additional information input section 20, and the inputted additional information is encoded by the code image generation section 24 to generate one or more machine-readable code images, which are stored at the code image buffer 26. Herein, the code image generation section 24 generates machine-readable code patterns which use patterns to represent zeros and ones of the machine-readable code images, which have been stored at the code pattern storage section 22 (for example, zero is represented by '\' and 1 is represented by '/').

The latent image-processing system 14 is structured with a latent image input section 28, a latent image generation section 30 and a latent image buffer 32.

At the latent image-processing system 14, a character string or the like, which will be retained or eliminated at a time of photocopying, is inputted by the latent image input section 28, the inputted character string is rendered by the latent image generation section 30, and the rendered image is stored at the latent image buffer 32 to serve as a latent image. In the present embodiment, a portion constituting the latent image is constituted by black pixels.

The document image-processing system 16 is structured with a print data input section 34, a document image generation section 36 and a document image buffer 38.

At the document image-processing system 16, print data that a user wishes to have printed is inputted by the print data input section 34, and a document image is generated from the inputted print data by the document image generation section 36 and is stored at the document image buffer 38. For example, document data expressed in PDL (Printer Description Language) which has been transmitted from an external computer or the like is inputted at the print data input section 34. At the document image generation section 36, the PDL data is rastered and image data in the form of a binary image is generated.

Here, in a case in which information—such as an IP (Internet Protocol) address of a computer that is sending a print job, a name of a user sending the print job, a name of a document file to be printed, a timestamp for the document to be printed, an encoded information of a password specified for the document file, the latent image character string to be embedded as the latent image and the like are added to a header portion of the document data expressed in PDL to serve as additional information, the additional information input section 20 and the latent image input section 28 may input the additional information, the character string and the like from this information of the header portion.

The image synthesis-processing system 18 is structured by a code image arrangement section 40, a latent image overlap judgement section 42, a superposed image buffer 44 and an image synthesis section 46.

At the image synthesis-processing system 18, the machine-readable code image(s) stored at the code image buffer 26 is/are superposed with the latent image stored at the latent image buffer 32 and a superposed image is generated, by the code image arrangement section 40 and the latent image overlap judgement section 42. The superposed image and the document image are then synthesized by the image synthesis section 46.

More specifically, the latent image overlap judgement section 42 divides the latent image into plural regions according to the size of the machine-readable code images, and judges for each divided region whether or not the latent image would overlap with a machine-readable code image thereat. Then, on the basis of the judgement results of the latent image overlap judgement section 42, the code image arrangement section 40 arranges the machine-readable code images. Hence, the latent image is superposed with the machine-readable code images to create the superposed image, which is stored at the superposed image buffer 44. That is, the machine-readable code images and latent image are arranged so as not to overlap by the code image arrangement section 40 and latent image overlap judgement section 42, and then the latent image is superposed with the machine-readable code images to generate the superposed image. Further, the image synthesis section 46 synthesizes the superposed image which is stored at the superposed image buffer 44 with the document image which is stored at the document image buffer 38.

Figure 2A:
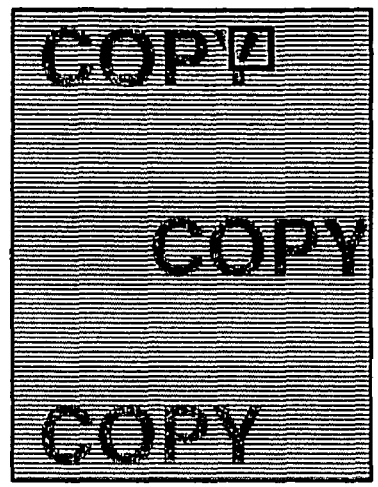
FIG. 2A is a view showing an example of a superposed image which is outputted from the image processing device relating to the embodiment of the present invention.
Figure 2B:
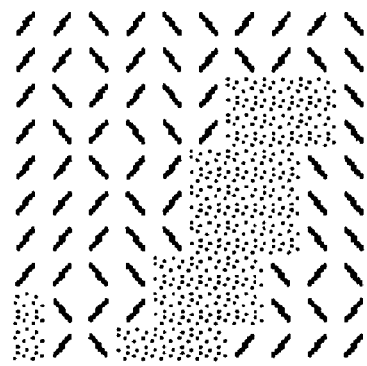
FIG. 2B is a view in which of a portion of FIG. 2A (a square region of FIG. 2A) is enlarged.
Figure 2C:
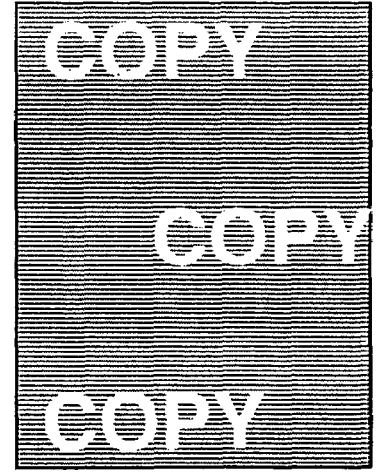
FIG. 2C is a view showing an example of an image that is outputted when the superposed image is photocopied.

FIG. 2A is a view showing an example of a superposed image which is outputted from the image processing device relating to the present embodiment of the invention, FIG. 2B is a view in which a portion of FIG. 2A (a square region of FIG. 2A) is enlarged, and FIG. 2C is a view showing an example of an image that is outputted when the superposed image is photocopied.

In a superposed image that is outputted from the image processing device 10 relating to this embodiment of the present invention, the machine-readable code images (images in which the additional information is recorded by '\'s and '/'s) are synthesized with the latent image ('COPY'). As shown in FIG. 2B, in magnification, the machine-readable code images are not rendered at portions at which the latent image is rendered. Further, the latent image is formed by extremely small dots and, as shown in FIG. 2C, the dots of the latent image will disappear if photocopied. For the present embodiment, a case in which the latent image disappears when photocopied is illustrated. However, the latent image could be retained when photocopied.

Figure 3A:
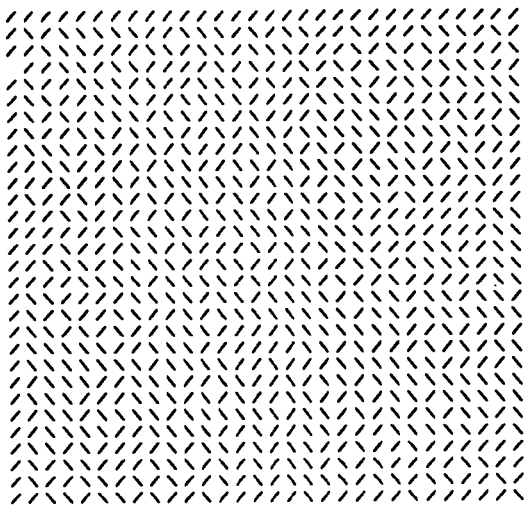
FIG. 3A is a view showing an example of a machine-readable code image.
Figure 3B:
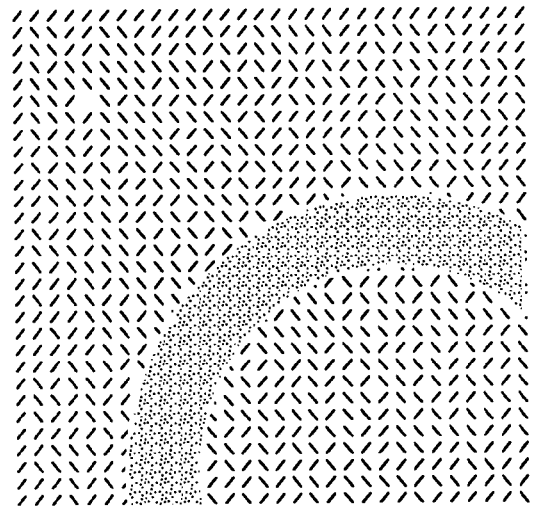
FIGS. 3B and 3C are views showing machine-readable code images in states of overlapping with a latent image.
Figure 3C:
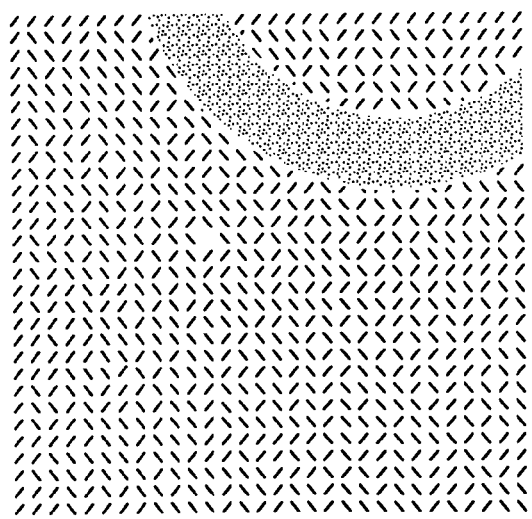

Now, the machine-readable code images that are generated by the code image-processing system 12 will be described in more detail. FIGS. 3A, 3B and 3C are views showing examples of machine-readable code images, which are machine-readable code images in which '\'s corresponding to zero-bits and '/'s corresponding to one-bits are lined up in predetermined quantities.

As shown in FIG. 3A, in a state in which the latent image is not overlapping, the machine-readable code image is recorded in full. Consequently, it is possible to extract the additional information from that machine-readable code image unit. It is desirable to record the machine-readable code images in such states.

FIGS. 3B and 3C show machine-readable code images in states overlapping with the latent image. Because of the overlapping with the latent image, a portion of the machine-readable code image at the lower side of FIG. 3 is lost, and a portion of the machine-readable code image at the upper side of FIG. 3C is lost. In the case of such states, it is not possible to extract the additional information from the respective machine-readable code image units.

Accordingly, in the image processing device relating to the present embodiment, an arrangement of machine-readable code images is such that a plurality of types of the machine-readable code images are uniformly arranged. More specifically, regions in which the latent image is present and regions in which the latent image is not present are sorted apart, and the machine-readable code images are arranged such that all the types of machine-readable code image will be recorded at regions in which the latent image is not present. As a result, when the latent image has been superposed with the machine-readable code images to create the superposed image, it is possible to extract all the types of machine-readable code image from the regions in which the latent image is not present.

For example, as shown in FIG. 4A, the latent image ('COPY') is divided up into plural regions according to the size of the machine-readable code images. Each of the regions may include an overlapping region including a region at which the machine-readable code images will actually overlap with the latent image. For each divided region, as shown in FIG. 4B, regions with the latent image and regions without the latent image are determined by the latent image overlap judgement section 42. On the basis of these determination results, as shown in FIG. 4C, the machine-readable code images are arranged by the code image arrangement section 40 such that all the types of machine-readable code image (Codes 1 to 4 in FIG. 4C) are arranged at divided regions without the latent image. As a result, it is possible to extract all the machine-readable codes from the superposed image in which the latent image has been superposed with the machine-readable code images.

Next, a flow of processing that is performed at the image processing device 10 relating to this embodiment of the present invention which is structured as described above will be described.

Herein, previously known technologies can be applied to storage of the machine-readable code images to the code image buffer 26 by the code image-processing system 12, storage of the latent image to the latent image buffer 32 by the latent image-processing system 14, and storage of the document image to the document image buffer 38 by the document image-processing system 16. Accordingly, detailed descriptions thereof is omitted.

Figure 5:
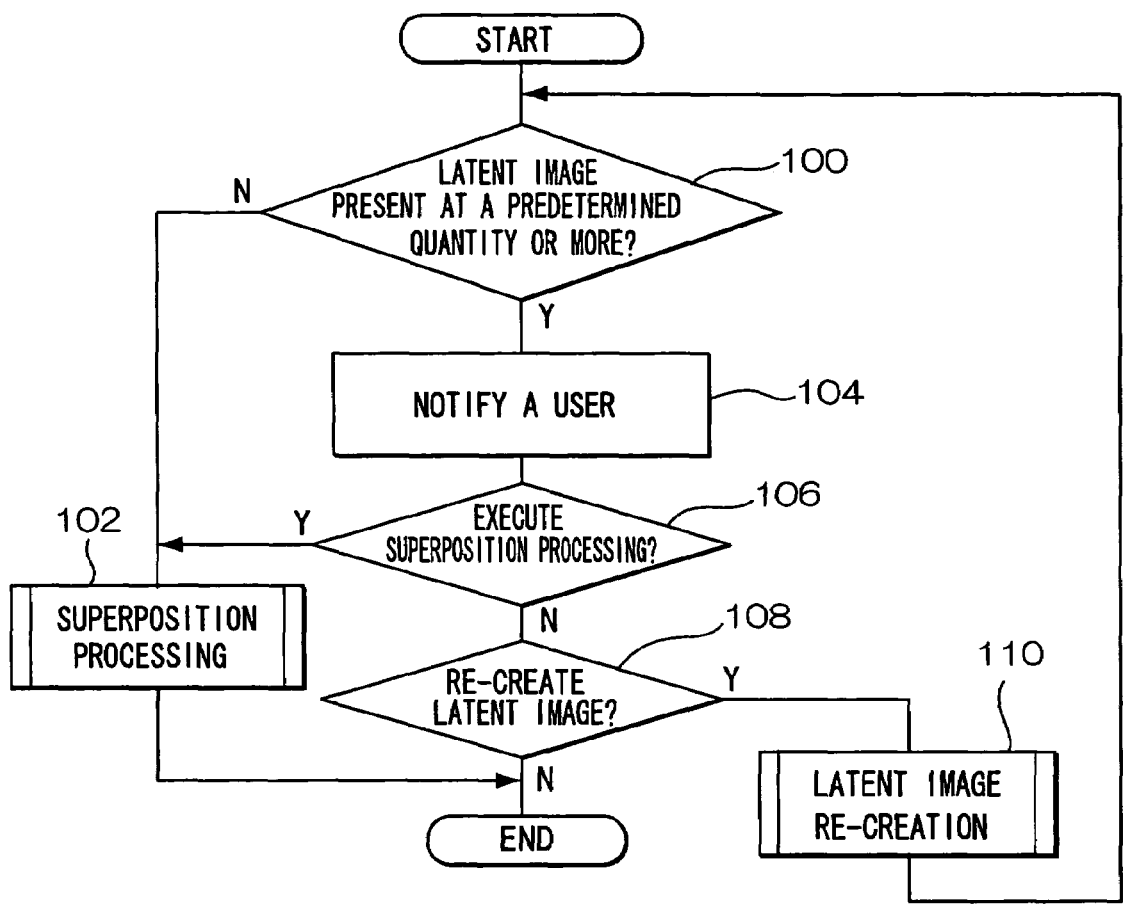
FIG. 5 is a flowchart showing an example of a flow of processing which is performed by an image synthesis processing system of the image processing device relating to the embodiment of the present invention.
Figure 7B:
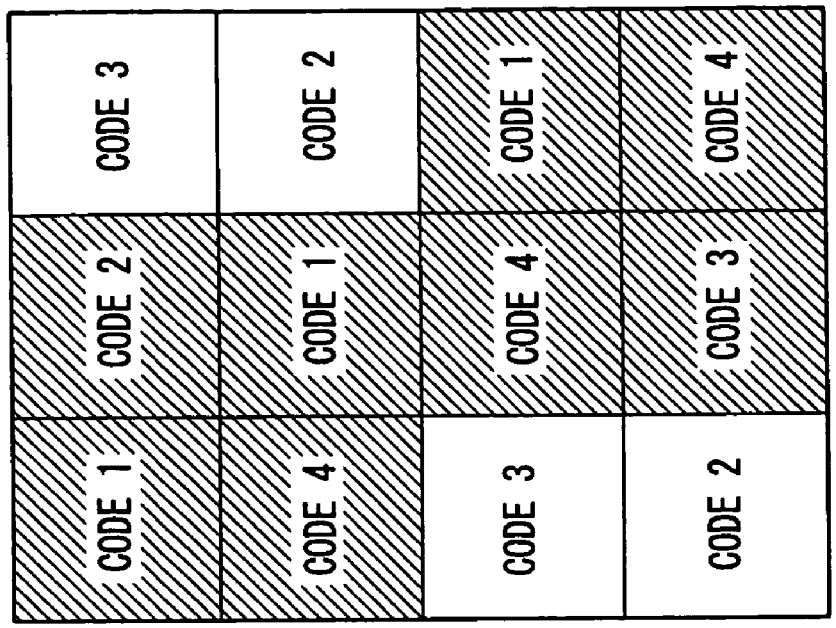
FIGS. 7A and 7B are views for describing conventional technologies, which do not give consideration to overlapping of machine-readable code images with latent images.
Figure 7A:
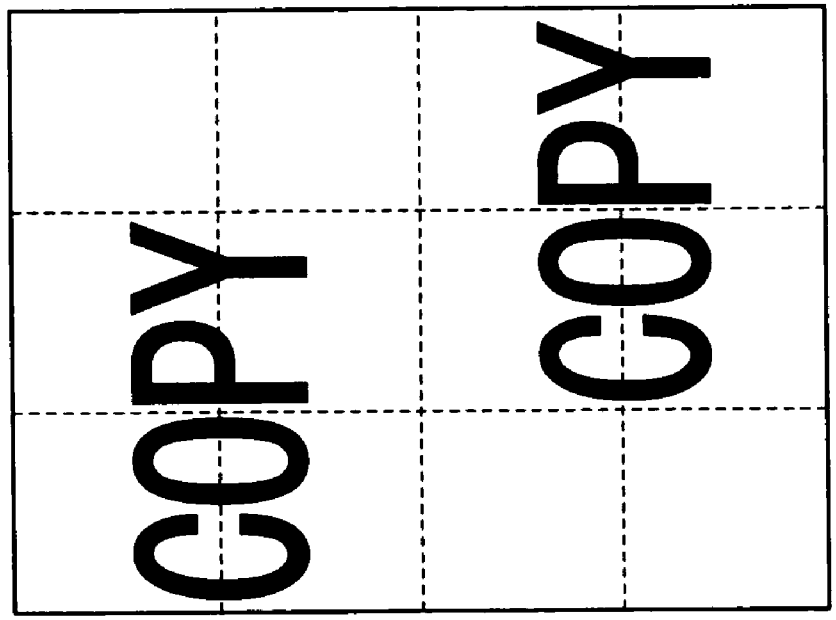

FIG. 5 is a flowchart showing an example of a flow of processing that is carried out at the image synthesis-processing system 18 of the image processing device 10 relating to this embodiment of the present invention.

First, in step 100, the latent image is divided into plural regions with the size of the machine-readable code images by the latent image overlap judgement section 42, and the latent image overlap judgement section 42 judges whether or not the latent image is present at a predetermined quantity or more of the divided regions. If this judgement is positive, the flow advances to step 104. If the judgement is negative, the flow advances to step 102 and superposition processing (which will be described in more detail later) is performed, and this sequence of the processing ends. Here, it could be judged in step 100 whether or not a number of regions at which the latent image is not present is smaller than the number of machine-readable codes that are to be arranged. Alternatively, rather than dividing up the latent image, it may be judged whether or not a proportion of the latent image with respect to the overall image (which is to be the superposed image) is equal to or greater than a predetermined proportion (for example, 50%).

In step 104, notification to a user is implemented. That is, the user is notified that there are at least the predetermined quantity of regions at which the latent image and the machine-readable code images will overlap, and that it is possible that the machine-readable code images will not be extractable.

Next, in step 106, it is determined whether or not superposition processing is to be executed. This determination is judged by whether or not a superposition processing instruction has been given by the user. If this judgement is positive, the flow advances to step 102 and the superposition processing is executed. If the judgement is negative, the flow advances to step 108.

In step 108, it is determined whether or not the latent image is to be re-created. For this determination, the user is notified as to whether or not to re-create the latent image. If a re-creation instruction is given by the user, the determination is positive and the flow advances to step 110. If an instruction not to re-create is given by the user, the determination is negative and this sequence of the processing ends.

In step 110, the latent image is re-created. For example, a change in a font or the like of a character string of the latent image, a reduction in size of the latent image, or the like is implemented, and the latent image is re-created. After this the flow returns to step 100 and the above-described processing is repeated.

Now, the above-mentioned superposition processing will be described in more detail. FIG. 6 is a flowchart showing an example of a flow of superposition processing that is performed at the image synthesis-processing system 18 of the image processing device 10 relating to this embodiment of the present invention.

In step 200, the latent image overlap judgement section 42 acquires an arrangement of machine-readable code images that have been stored in the code image buffer 26, through the code image arrangement section 40, and the flow advances to step 202. In step 202, the latent image overlap judgement section 42 acquires the latent image stored in the latent image buffer 32, and the flow advances to step 204.

In step 204, the latent image overlap judgement section 42 divides up the latent image in accordance with the size of the machine-readable code images, and the flow advances to step 206. For example, as shown in FIG. 4A, the latent image is divided up into divided regions of twelve equal portions, in accordance with the size of the machine-readable code images.

In step 206, the latent image overlap judgement section 42 compares the divided latent image with the arrangement of machine-readable code images, and the flow advances to step 208.

In step 208, the latent image overlap judgement section 42 judges whether or not the latent image is present at each of the divided regions into which the latent image has been divided, and the flow advances to step 210. That is, as shown in FIG. 4B, it is judged whether each divided region is a region with the latent image or a region without the latent image. Here, if a proportion of a divided region with which the latent image overlaps is less than or equal to a predetermined proportion, then the judgement of step 208 may determine that the latent image and a machine-readable code image will not overlap thereat.

In step 210, the machine-readable code images are re-arranged by the code image arrangement section 40, and the flow advances to step 212. For example, a set of regions at which the latent image and the machine-readable code images will overlap and a set of regions at which the same will not overlap are set apart, and the machine-readable code images are arranged sequentially in respective regions separately. Thus, as shown in FIG. 4C, the machine-readable code images are arranged by the code image arrangement section 40 such that all of the types of machine-readable code image are disposed at divided regions in which the latent image is not present. Here, when the machine-readable code images are to be re-arranged, if there are too many overlapping regions and it is not possible to dispose all the types of machine-readable code image at regions at which the latent image is not present, a user may be notified of this. Alternatively, specifications of the latent image may be re-modified, or the superposition processing may be stopped and ended. It is also possible for the user to be notified when superposition processing is stopped. Furthermore, in a case in which there are more regions at which arrangement is possible than types of machine-readable code image to be arranged, it is desirable for the respective machine-readable code images to be arranged evenly, in order to raise respective verification rates of the machine-readable codes. For example, the machine-readable code images may be arranged in dispersed manners such that machine-readable code images of the same type are not locally concentrated, and may be arranged uniformly such that the respective types of machine-readable code image are arranged in substantially equal numbers.

In step 212, the code image arrangement section 40 superposes the latent image with the machine-readable code images to create a superposed image, the superposed image that has been created is stored to the superposed image buffer 44, and the flow advances to step 214.

In step 214, the image synthesis section 46 acquires the document image from the document image buffer 38, and the flow advances to step 216.

In step 216, the superposed image in which the latent image has been superposed with the machine-readable code images and the document image acquired in step 214 are synthesized by the image synthesis section 46, and this sequence of the superposition processing ends.

The superposed image created by superposing the latent image with the machine-readable code images, which is provided from the image processing device 10 relating to the present embodiment by performance of such superposition processing, records the plurality of different machine-readable code images at the regions at which the latent image and the machine-readable code images do not overlap, so as to appear evenly/uniformly with respect to the regions, for example, as shown in FIG. 4C. Consequently, it is possible to raise an accuracy with which all the machine-readable code images will be extracted from the superposed image. That is, it is possible to improve a detection accuracy of the machine-readable code images, in addition to which an improvement in a detection speed of the machine-readable code images can be expected.

Now, in the embodiment described above, a set of regions at which the latent image and the machine-readable code images will overlap and a set of regions at which the same will not overlap are set apart, and the machine-readable code images are arranged sequentially in respective regions. However, the present invention is not limited to this manner. It is also possible to set apart the set of regions at which the latent image and the machine-readable code images overlap and the set of regions at which the same will not overlap and to respectively separately arrange the machine-readable code images at random.

As described hereabove, when a latent image which is retained or eliminated by photocopying is superposed with machine-readable code images which encode additional information and a superposed image is generated, the latent image and the machine-readable code images cannot be rendered in the same regions, as mentioned earlier. Therefore, it is necessary to prevent overlapping of the latent image and the machine-readable code images.

Accordingly, in the image processing device of the present invention, when a superposed image is to be generated, overlapping of the latent image with the machine-readable code images is judged by a judgement section and, on the basis of the judgement results, an arrangement of the machine-readable code images is determined and the superposed image is generated by a generation section. That is, the arrangement of machine-readable codes is set on the basis of the judgement results of overlapping of the latent image with the machine-readable codes, and thus the machine-readable codes and latent image can be prevented from overlapping. Hence, when the latent image has been superposed with the machine-readable code images, it will be possible to reliably extract the machine-readable code images.

Herein, the judgement section may divide up the latent image in accordance with a size of the machine-readable code images, and judge the overlapping of the latent image with the machine-readable codes at each divided region.

Further, the generation section may, on the basis of the judgement results of the judgement section, determine arrangements of the machine-readable code images separately for regions at which the machine-readable code images will overlap with the latent image and regions at which the same will not overlap.

Further, the judgement section may judge that a machine-readable code image will overlap with the latent image if a predetermined proportion or more of the latent image will be included in an overlapping region including a region at which the machine-readable code images will actually overlap with the latent image. Alternatively, if an overlapping region including a region at which the machine-readable code images will actually overlap with the latent image, occupies a predetermined quantity or more of the overall image, the judgement section may judge that the machine-readable code images will overlap with the latent image.

At such a time, in a case in which the overlapping region at which the machine-readable code images will overlap with the latent image occupies more than the predetermined quantity of the whole, it may be difficult to arrange the machine-readable codes such that all the machine-readable codes can be extracted. Therefore, a notification section which, if the judgement section judges that the machine-readable code images will overlap with the latent image, gives notification of this judgement result may be further provided.

Further, a re-creation section which, if the judgement section judges that the machine-readable code images will overlap with the latent image, re-creates the latent image (for example, re-creating the latent image with a size or the like of the latent image being reduced, or the like) may be further provided.

Further yet, a discontinuation section which, if the judgement section judges that the machine-readable code images will overlap with the latent image, discontinues generation of the superposed image by the generation section may be further provided.

Herein, a synthesis section which synthesizes the superposed image with a document image may be further provided.

Furthermore, the present invention can also be realized in the form of a method corresponding to the above-described image processing device.

That is, in the image processing method of the present invention, when a superposed image is to be generated, overlapping of the latent image with the machine-readable code images is judged, an arrangement of the machine-readable code images is determined on the basis of results of the judging, and the superposed image is generated. That is, the arrangement of machine-readable codes is set on the basis of judgement results of overlapping of the latent image with the machine-readable codes, and thus the machine-readable codes and latent image can be prevented from overlapping. Hence, when the latent image has been superposed with the machine-readable code images, it will be possible to reliably extract the machine-readable code images.

Herein, the judging may include dividing up the latent image in accordance with a size of the machine-readable code images, and judging the overlapping of the latent image with the machine-readable codes at each divided region.

Further, the generating may include, on the basis of the results of the judging, determining arrangements of the machine-readable code images respectively and separately for regions at which the latent image and the machine-readable code images will overlap and regions at which the same will not overlap.

Further, the judging may include judging that a machine-readable code image will overlap with the latent image if a predetermined proportion or more of the latent image will be included in an overlapping region including a region at which the machine-readable code images will actually overlap with the latent image.

Alternatively, if an overlapping region including a region at which the machine-readable code images will actually overlap with the latent image, occupies a predetermined quantity or more of the overall image, the judging may include judging that the machine-readable code images will overlap with the latent image.

At such a time, in a case in which the overlapping region at which the machine-readable code images will overlap with the latent image occupies more than the predetermined quantity of the whole, it may be difficult to arrange the machine-readable codes such that all the machine-readable codes can be extracted. Therefore, if it has been judged in the judging that the machine-readable code images will overlap with the latent image, giving notification of this judgement result may be further included.

Further, if it has been judged in the judging that the machine-readable code images will overlap with the latent image, re-creating the latent image (for example, re-creating the latent image with a size or the like of the latent image being reduced, or the like) may be further included.

Further yet, if it has been judged in the judging that the machine-readable code images will overlap with the latent image, discontinuing generation of the superposed image may be further included.

Herein, the method described above may further include synthesizing the superposed image with a document image.

Furthermore, the present invention can also be realized by a computer-readable storage medium storing an image processing program which is executable by a computer to perform the image processing described above.

What is claimed is:

1. An image processing device comprising:
    a judgement section which, when a latent image is to be superposed with machine-readable code images for generating a superposed image, the latent image is retained or eliminated by photocopying and the machine-readable code images are encoded additional information, judges overlapping of the latent image with the machine-readable code images; and
    a generation section which, on the basis of a judgement result of the judgement section, determines an arrangement of the machine-readable code images such that each machine-readable code image does not overlap with the latent image, and generates the superposed image.

2. The image processing device of claim 1, wherein the judgement section divides up the latent image in accordance with a size of the machine-readable code images, and judges the overlapping at each divided region.

3. The image processing device of claim 1, wherein, on the basis of the judgement result of the judgement section, the generation section determines arrangements of the machine-readable code images respectively and separately for
    regions at which the machine-readable code images will overlap with the latent image and
    regions at which the machine-readable code images will not overlap with the latent image.

4. The image processing device of claim 1, wherein the judgement section judges that a machine-readable code image will overlap with the latent image if a predetermined proportion or more of the latent image will be included in an overlapping region including a region at which the machine-readable code images will actually overlap with the latent image.

5. The image processing device of claim 1 wherein, if an overlapping region including a region at which the machine-readable code images will actually overlap with the latent image, occupies a predetermined quantity or more of the overall image, the judgement section judges that the machine-readable code images will overlap with the latent image.

6. The image processing device of claim 5, further comprising a notification section which, if the judgement section judges that the machine-readable code images will overlap with the latent image, gives notification of this judgement result.

7. The image processing device of claim 5, further comprising a re-creation section which, if the judgement section judges that the machine-readable code images will overlap with the latent image, re-creates the latent image.

8. The image processing device of claim 5, further comprising a discontinuation section which, if the judgement section judges that the machine-readable code images will overlap with the latent image, discontinues generation of the superposed image by the generation section.

9. The image processing device of claim 1, further comprising a synthesis section which synthesizes the superposed image with a document image.

10. An image processing method comprising:
    when a latent image is to be superposed with machine-readable code images for generating a superposed image, the latent image is retained or eliminated by photocopying and the machine-readable code images are encoded additional information, judging overlapping of the latent image with the machine-readable code images; and
    generating the superposed image, including determining an arrangement of the machine-readable code images on the basis of a result of the judging such that each machine-readable code image does not overlap with the latent image.

11. The image processing method of claim 10, wherein the judging includes
    dividing up the latent image in accordance with a size of the machine-readable code images, and
    judging the overlapping at each divided region.

12. The image processing method of claim 10, wherein the generating includes, on the basis of the result of the judging, determining arrangements of the machine-readable code images respectively and separately for
    regions at which the machine-readable code images will overlap with the latent image and
    regions at which the machine-readable code images will not overlap with the latent image.

13. The image processing method of claim 10, wherein the judging includes judging that a machine-readable code image will overlap with the latent image if a predetermined proportion or more of the latent image will be included in an overlapping region including a region at which the machine-readable code images will actually overlap with the latent image.

14. The image processing method of claim 10, wherein, if an overlapping region including a region at which the machine-readable code images will actually overlap with the latent image, occupies a predetermined quantity or more of the overall image, the judging includes judging that the machine-readable code images will overlap with the latent image.

15. The image processing method of claim 14, further comprising, if it has been judged in the judging that the machine-readable code images will overlap with the latent image, giving notification of this judgement result.

16. The image processing method of claim 14, further comprising, if it has been judged in the judging that the machine-readable code images will overlap with the latent image, re-creating the latent image.

17. The image processing method of claim 14, further comprising, if it has been judged in the judging that the machine-readable code images will overlap with the latent image, discontinuing generation of the superposed image.

18. The image processing method of claim 10, further comprising synthesizing the superposed image with a document image.

19. A storage medium readable by a computer, the storage medium storing an image processing program executable by the computer to perform image processing, the processing comprising:

when a latent image is to be superposed with machine-readable code images for generating a superposed image, the latent image is retained or eliminated by photocopying and the machine-readable code images are encoded additional information, judging overlapping of the latent image with the machine-readable code images; and generating the superposed image, including determining an arrangement of the machine-readable code images on the basis of results of the judging such that each machine-readable code image does not overlap with the latent image.

\* \* \* \* \*